United States Patent [19]

Mahn

[11] 4,423,106

[45] * Dec. 27, 1983

[54] LAMINATED MATERIAL AND METHOD OF FORMING

[76] Inventor: John E. Mahn, 5688 Woodhaven Dr., Cincinnati, Ohio 45211

[ * ] Notice: The portion of the term of this patent subsequent to May 26, 1998, has been disclaimed.

[21] Appl. No.: 371,202

[22] Filed: Apr. 23, 1982

Related U.S. Application Data

[60] Continuation of Ser. No. 172,818, Jul. 28, 1980, abandoned, which is a division of Ser. No. 6,750, Jan. 26, 1979, Pat. No. 4,269,885.

[51] Int. Cl.³ .......................... B32B 3/00; B32B 7/02; B29C 19/00
[52] U.S. Cl. .................... 428/207; 156/230; 156/240; 156/243; 156/244.11; 156/244.27; 428/213; 428/216; 428/286; 428/287; 428/334; 428/335; 428/423.7; 428/904
[58] Field of Search .............. 428/216, 194, 423.7, 428/320, 195, 423.5, 904, 207, 286, 287, 334, 335, 213; 156/230, 240, 235, 243, 239, 244.27, 244.19, 244.23, 244.24; 264/45.8, 45.9, 46.2, 46.3

[56] References Cited

U.S. PATENT DOCUMENTS

| | | | |
|---|---|---|---|
| Re. 28,542 | 9/1975 | Meyer | 428/200 |
| 2,536,420 | 1/1951 | Burdick | 156/235 |
| 2,639,255 | 5/1953 | Meyer | 428/194 |
| 3,238,087 | 3/1966 | Norwalk et al. | 542/414 |
| 3,359,127 | 12/1967 | Meyer et al. | 428/200 |
| 3,542,616 | 11/1970 | Cain et al. | 156/224 |
| 3,547,753 | 10/1970 | Sutton | 156/230 |
| 3,595,739 | 7/1971 | Meyer | 428/195 |
| 3,616,176 | 10/1971 | Jackimowicz | 156/240 |
| 3,649,439 | 3/1972 | Ross | 428/423.7 |
| 3,660,212 | 5/1972 | Liebe | 428/41 |
| 3,684,635 | 8/1972 | Staats | 428/76 |
| 3,884,742 | 5/1975 | Roberts | 156/268 |
| 3,900,673 | 8/1975 | Mattimoe et al. | 428/409 |
| 3,920,499 | 11/1975 | Day et al. | 156/240 |
| 3,922,418 | 11/1975 | Lauchenauer | 428/196 |
| 3,922,435 | 11/1975 | Asnes | 428/349 |
| 4,037,008 | 7/1977 | Tugwell | 428/349 |
| 4,059,469 | 11/1977 | Mattimoe et al. | 428/480 X |
| 4,064,285 | 12/1977 | Mammino | 156/235 |
| 4,071,390 | 1/1978 | Strassel | 156/243 X |
| 4,269,885 | 5/1981 | Mahn | 428/423.7 X |

FOREIGN PATENT DOCUMENTS

| | | | |
|---|---|---|---|
| 2039604 | 1/1971 | France | 428/349 |
| 1440030 | 6/1976 | United Kingdom | 428/423.1 |

*Primary Examiner*—Thomas J. Herbert, Jr.
*Attorney, Agent, or Firm*—Kinney and Schenk

[57] ABSTRACT

A laminated material is formed of a layer of polyurethane or polyether and a layer of extruded polyester. The polyester adhesive layer, which may contain five to fifteen percent by weight of polyurethane homogeneously mixed therein, is bonded to the layer of polyurethane or polyether under pressure at a sufficiently high temperature to permit an even viscous molecular flow between adjacent surfaces of the layers. When the layer is polyurethane, the temperature is above the softening point of polyurethane so that it is high enough to remove at least enough of the toluene solvent from the layer of polyurethane so that curling is prevented. When the laminated material is applied to a material with sufficient pressure and heated sufficiently that the layer of polyester becomes adhesive, the laminated material adheres to the material against which the layer of polyester is pressed. Thus, the laminated material has particular utility as a letter, numeral, or design for a sport uniform or wearing apparel, for example, of any material.

23 Claims, 2 Drawing Figures

LAMINATED MATERIAL AND METHOD OF FORMING

This is a continuation of application Ser. No. 172,818, filed July 28, 1980, now abandoned, which is a division of Ser. No. 006,750 filed Jan. 26, 1979, which is now U.S. Pat. No. 4,269,885 issued May 26, 1981.

When applying letters or numerals, for example, to a sport uniform such as a basketball or baseball uniform, for example, the letters and/or numerals have previously been applied by sewing or by mechanically bonding the letter or numeral to the fabric through having the letter or numeral encapsulate or wrap around the fibers of the fabric of the uniform. Sport uniforms also have had letters or numerals applied by silk screening, but this has not produced the more desired raised letter or numeral that is obtained when sewing or mechanically bonding a letter or numeral to the sport uniform.

One type of lettering material for application to a sport uniform is shown and described in U.S. Pat. No. 3,660,212 to Liebe, Jr. The material of the aforesaid Liebe, Jr. patent has two layers of polyvinylchloride bonded to each other. Furthermore, one of the layers of polyvinylchloride is releasably adhered to a release sheet. The lettering material of the aforesaid Liebe, Jr. patent requires the release sheet to which heat is applied to cause the material to adhere to the fabric of the uniform.

The lettering material of the aforesaid Liebe, Jr. patent curls on the release sheet after a period of time. Thus, the product is not stable because of curling so that it has a relatively short shelf life.

This adhering of the lettering material of the aforesaid Liebe, Jr. patent to the material of the sport uniform is a mechanical bonding. This is due to the lettering material sinking into the material of the sport uniform and encapsulating the fabric.

Another problem with the lettering material of the aforesaid Liebe, Jr. patent is that it ages on the shelf. Furthermore, it tends to become stiff and brittle if it is washed due to hydrolysis.

The laminated material of the present invention overcomes the disadvantages of the prior available lettering materials in that no mechanial bonding is required. Furthermore, the laminating material of the present invention can be applied to any material including vinyl and nylon.

The material of the aforesaid Liebe, Jr. patent is not compatible with all materials. For example, the lettering material of the aforesaid Liebe, Jr. patent cannot be applied to nylon because vinyl is an incompatible adhesive with nylon.

In comparison with previously available lettering materials for sport uniforms, the time period for applying the laminated material of the present invention is significantly reduced. Thus, the normal range for application of the laminating material of the present invention as a letter or numeral on a sport uniform is from five to eight seconds whereas previous application time was about eighteen seconds. Additionally, special heat seal equipment or radio frequency equipment may be employed to enable the laminating material of the present invention to be applied in one second or less. This results in a significant labor cost reduction when lettering a plurality of uniforms.

The laminated material of the present invention is formed so that a sport uniform can have letters or numerals of two different colors through placing a smaller letter or numeral of one color on top of a larger letter or numeral of another color and applying heat and pressure to both simultaneously with the smaller letter or numeral adhering to the larger letter or numeral. This cannot be produced by the lettering material of the aforesaid Liebe, Jr. patent because of the requirement of a release sheet in the aforesaid Liebe, Jr. patent.

When applying letters or numerals formed of the laminated material of the present invention to a sport uniform, there is a built in quality control. That is, about one half of a single letter or numeral is initially applied to the fabric of the sport uniform and then an attempt is made to peel the adhered letter or numeral from the fabric. If the letter or numeral peels off the garment before breaking, then it has not been applied properly. This type of quality control test is not available from the prior available materials because they encapsulate or wrap around the fibers of the uniform material so that they cannot be peeled without damaging the uniform material.

When desired, the laminated material of the present invention is easily removed from the fabric to which it is attached without damaging either the fabric or the laminated material so that the laminated material can be used over again. This is accomplished through utilizing methylenechloride. While methylenechloride can be employed to remove polyvinylchloride material from another fabric such as that of the lettering material of the aforesaid Liebe, Jr. patent, it removes the polyvinylchloride by dissolving it. Thus, a letter, which is formed from the material of the aforesaid Liebe, Jr. patent, cannot be reused while a letter formed from the laminated material of the present invention can be reused.

The laminated material of the present invention is relatively light weight and thin in comparison with the previously available lettering material such as that of the aforesaid Liebe, Jr. patent, for example. Thus, the weight of letters formed from the laminated material of the present invention is not relatively noticeable by the wearer.

The laminated material of the present invention is formed of a layer of extruded polyester material and a layer of polyurethane or polyester material of any color bonded to each other. When bonding the two layers to each other under pressure, the temperature is sufficiently high (It is above the softening point of polyurethane.) to remove at least some of the toluene solvent from the layer of polyurethane. The temperature also is high enough to permit penetration between adjacent surfaces of the layer of polyester and the layer of polyurethane or polyether at an even rate so that there is even molecular flow whereby the two bonded layers have a continuous coherency. This temperature above the softening point of polyurethane also results in the two layers having the same coefficient of expansion and contraction whereby the laminated material will not curl after a period of time as prior lettering materials tend to do.

When bonding the polyurethane and polyester layers to each other, the laminated material is stronger than either the polyester material or the polyurethane material. Thus, a stronger material is produced by the present invention.

If desired, polyurethane pellets can be homogeneously mixed with the polyester pellets prior to extrusion of the layer of polyester. By weight, polyurethane would comprise five percent to fifteen percent of the mixture with polyester.

The use of the laminated material of the present invention enables the material, when used as a letter or numeral on a sport uniform, for example, to have any type of finish. Thus, the finish can be shiney or dull or matte.

When the laminated material of the present invention is applied to a sport uniform, for example, the polyurethane softens at 375° F. to 400° F. to permit various types of finishes to be produced in the polyurethane. For example, if a heavy silicone paper is disposed on the polyurethane layer, a shiney surface is produced. Thus, the type of paper employed at the time of applying the laminated material to a sport uniform, for example, determines the type of finish.

The laminated material of the present invention also can have printing thereon and this printing can be fused to the laminated material when it is mounted on a substrate to which it is difficult for most materials to adhere such as vinyl or nylon, for example. Therefore, the laminated material of the present invention is not limited to utilization as a letter or numeral on a sport uniform and can be formed so as to have printed information thereon rather than being in the shape of a letter or numeral.

An object of this invention is to provide a unique laminated material.

Another object of this invention is to provide a method for forming a unique laminated material.

A further object of this invention is to provide a laminated material for application to another material through merely applying heat and pressure to the laminated material.

Other objects, uses, and advantages of this invention are apparent upon a reading of this description, which proceeds with reference to the drawing forming part thereof and wherein:

Figure 1:
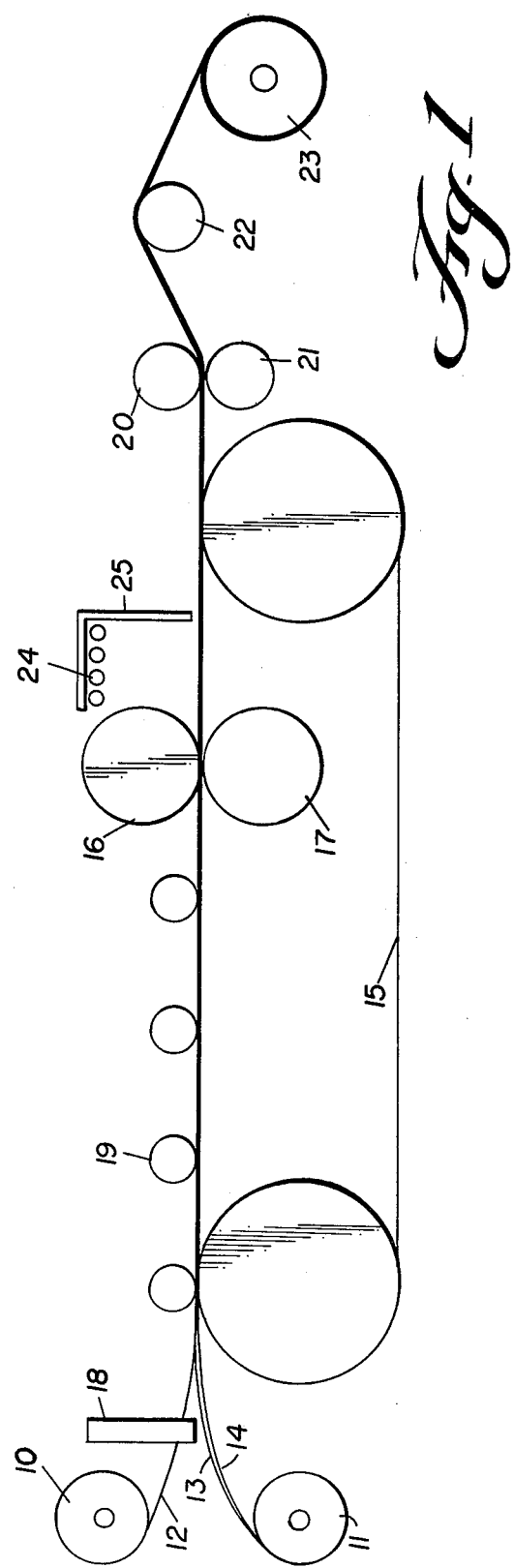
FIG. 1 is a schematic view of an apparatus utilized in bonding the two layers together to form the laminated material of the present invention.

Referring to the drawing and particularly FIG. 1, there is shown a pair of supply rolls or spools 10 and 11. The supply roll 10 has a layer 12 of polyurethane thereon, and the supply roll 11 has a layer 13 of polyester thereon.

Suitable examples of the polyurethane are sold by B. F. Goodrich as Tuftane 312 or Tuftane 322. Another suitable source of polyurethane is Deerfield Plastics, Deerfield, Mass.

The polyurethane is formed into a film having a thickness between three and five mils with the thickness preferably being four mils or less. At Goodrich, the film of polyurethane is formed by being blown out of an extruder, rolled, and calendared.

The layer 13 of polyester is extruded through disposing pellets of polyester, which can be purchased from USM Corporation, Waltham, Mass., for example, in a screw type extruder. This screw type extruder can have a twenty to one screw ratio, for example, with the temperature increasing as the material is advanced through the screw extruder by the screw. For example, the temperature may be 275° F. in a zone of the extruder receiving the pellets, 350° F. in a zone intermediate the end of the screw extruder, and 400° F. in a zone adjacent the discharge end of the screw extruder. As the heated polyester flows from the screw extruder, it passes through die lips, which could be at a temperature of 375° F., to be extruded into the desired film thickness. The layer 13 of polyester is preferably between two and three mils in thickness. It is desired for the thickness of the polyester layer 13 to be as thin as possible to reduce cost.

After the polyester layer 13 is extruded, it passes over a chill roll or bed, which is at 35° F. to 50° F. Thus, the polyester layer 13 is subjected to cooling for a selected period of time so that the polyester layer 13 becomes amorphous or non-tacky.

After being extruded through the die lips of the screw extruder, the layer 13 of polyester is directed onto a release sheet 14 (see FIG. 2), which can be a foil release paper or silicone release paper. This is prior to the layer 13 of polyester passing over the chill roll or bed. The release sheet 14 has a silicone release of preferably fifty grams but could be up to one hundred and fifty grams depending upon the application. It should be understood that the release sheet 14 is not required when using polyurethane from Deerfield Plastics but is required when polyurethane from Goodrich is used.

Figure 2:
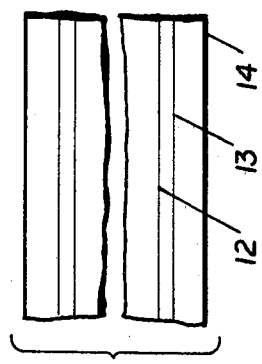
FIG. 2 is a bottom plan view showing the relationship of a layer of polyurethane, a layer of polyester, and a release sheet.

The release sheet 14 is wider than the layer 13 of polyester, which is wider than the layer 12 of polyurethane. These related widths are shown in FIG. 2.

For example, the release sheet 14 has a width of thirty inches to sixty inches while the layer 13 of polyester has a width of twenty-eight inches to fifty-six inches. The layer 12 of polyurethane has a width of twenty-seven and one-half inches to fifty-five inches. It should be understood that the release sheet 14 is removed for reuse.

The spool 11 (see FIG. 1) of polyester supplies the layer 13 of polyester and the release sheet 14, if it is used, therefrom to a feed belt 15 to feed the layer 13 between a pair of rollers 16 and 17. The belt 15 is formed of a suitable material to which the layer 13 of polyester does not adhere such as Teflon or silicone, for example, when the release sheet 14 is not used. The spool 10 of polyurethane supplies the layer 12 of polyurethane. This also passes between the rollers 16 and 17. The roller 16 is coated or covered with a suitable material such as Teflon or silicone, to prevent sticking or tacking of the layer 12 of polyurethane to the roller 16.

The rollers 16 and 17 are driven at the same rate by any suitable drive means such as a motor (not shown) and gearing (not shown), for example. The rollers 16 and 17 are driven at the same rate as the feed belt 15.

Thus, the driving of the feed belt 15 and the rollers 16 and 17 pulls the layer 13 of polyester with the release sheet 14, if it is used, from the spool 11, which has a brake, and the layer 12 of polyurethane from a spool 10, which has a brake. The brakes enable the layer 13 of polyester with the release sheet 14, if it is employed, and the layer 12 of polyurethane to be under even tension so as to be fed uniformly.

The rollers 16 and 17 are heated to produce sufficient heat along with the pressure applied by the rollers 16 and 17 to bond the layers 12 and 13 together to form a laminated material. At the same time, the temperature of the heated rollers 16 and 17 is sufficiently high (This is above the softening point of polyurethane.) to drive off enough of the toluene solvent from the layer 12 of polyurethane to prevent curling of the layer 12 of polyurethane as would occur when the bonded layers 12 and 13 are subjected to heat for application to a material such as a letter, for example. It should be understood that the release sheet 14 does not bond to the layer 13 of polyester because of the silicone release factor.

The rollers 16 and 17 exert a pressure of 40 p.s.i. on the layers 12 and 13 at the time of laminating them together. The temperature is dependent upon the feed rate of the layers 12 and 13 by the rollers 16 and 17. If the feed rate is twenty-five hundred yards per eight hours, for example, then a temperature of 500° F. will remove at least some of the toluene solvent from the layer 12 of polyurethane. A faster feed rate would require a higher temperature. If the feed rate is slower, a lower temperature may be employed as long as the pressure is increased. However, the lowest temperature is the softening point of the layer 12 of polyurethane. It should be understood that the pressure exerted by the rollers 16 and 17 can vary between 20 p.s.i. and 80 p.s.i.

An edge guide 18 is utilized with the layer 12 of polyurethane to control the tolerance of the layer 12 of polyurethane prior to being fed to the rollers 16 and 17. Guide rolls 19 hold the layer 12 of polyurethane against the layer 13 of polyester as the layer 13 of polyester is riding along the feed belt 15.

After the bonded layers 12 and 13 pass between the heated rollers 16 and 17, they are advanced by rollers 20 and 21, which are driven at the same rate as the rollers 16 and 17, to a cooling area having a chill roll 22, for example. The chill roll 22, which is driven at the same rate as the rollers 16 and 17, is maintained at a selected temperature such as 35° F. to 50° F., for example, to cool the bonded layers 12 and 13. Thus, the bonded layers 12 and 13 are subjected to cooling for a selected period of time and a selected temperature since the bonded layers 12 and 13 pass around a portion of the chill roll 22.

After passing around a portion of the chill roll 22, the bonded layers 12 and 13 and the release sheet 14 are wound around a storage spool 23, which is driven at the same rate as the rollers 16 and 17. When a sufficient amount of the bonded layers 12 and 13 is wound upon the storage spool 23, it is removed therefrom and allowed to cure for twenty-four to forty-eight hours.

Then, the edges of the layer 13 (see FIG. 2) of polyester are trimmed to have the same width as the layer 12 of polyurethane. The release sheet 14 is not trimmed since it is reused. After trimming of the layer 13 of polyester, the release sheet 14 is separated from the layer 13 of polyester to be used again.

During the passage of the bonded layers 12 and 13 from the rollers 16 and 17, they are subjected to heat from a plurality of bar heaters 24, which are disposed only above the bonded layers 12 and 13 and adjacent the heated roller 16. A cover 25 cooperates with the heaters 24 to direct the heat to the bonded layers 12 and 13. This heat, which is lower than the softening point of polyester and can be about 200° F., prevents curing of the bonded layers 12 and 13 too quickly after leaving the heated rollers 16 and 17 so that no bubbles remain within the bonded layers 12 and 13.

To prevent the layer 12 of polyurethane from bonding to itself and wrapping around the heated roller 16, the layer 12 of polyurethane must be placed on top of the layer 13 of polyester, which must be wider than the layer 12 of polyurethane. By having the layer 13 of polyester wider than the layer 12 of polyurethane, the edges of the layer 12 of polyurethane bind to the edges of the layer 13 of polyester rather than to themselves. Accordingly, this results in the layer 13 of polyester being capable of carrying the layer 12 of polyurethane through the rollers 16 and 17 and away from them. The heat produced by the heated rollers 16 and 17 is such that the edges of the layer 12 of polyurethane become tacky and would go around the heated roller 16 if the layer 13 of polyester was not present.

If desired, the release sheet 14 (see FIG. 2) could be eliminated through extruding the layer 13 of polyester directly onto the layer 12 of polyurethane. This would eliminate the requirement for the supply spool 11 (see FIG. 1).

In such an arrangement, the edge guide 18 would be eliminated and rollers would be disposed between the die lips of the extruder and the feed belt 15 to change the relationship of the layer 12 of polyester and the layer 13 of polyurethane so that the layer 13 of polyurethane is on top of the layer 12 of polyester at the time of reaching the feed belt 15. Furthermore, after passing over the chill roll 22, the bonded layers 12 and 13 would be trimmed as they were wound on the storage spool 23.

If desired, the layer 13 of polyester also could have polyurethane homogeneously mixed therein. Thus, pellets of polyurethane, which could be purchased from Goodrich or Deerfield Plastics, could be mixed with the pellets of polyester at the time of depositing in the screw extruder. The polyurethane would comprise five percent to fifteen percent by weight of the total mixture of polyurethane and polyester. The addition of polyurethane in the polyester layer 13 results in a softer feel to the hand and a more even intermixing of the adjacent surfaces of the layer 12 of polyurethane and the layer 13 of polyester to prevent curling and to produce better lamination.

While the layer 12 has been previously described as being formed of polyurethane, it should be understood that the layer 12 also could be formed of polyether. One suitable source of the polyether is Deerfield Plastics, Deerfield, Mass.

When forming the layer 12 of polyether, the polyester layer 13 does not have any polyurethane mixed therewith. This is because of the viscosity of polyether being compatible with polyester.

While the present invention has shown and described the layer 12 of polyurethane having at least some toluene driven off during bonding of the layer 12 of polyurethane and the layer 13 of polyester to each other, it should be understood that it is not necessary to remove the toluene at the same time as bonding of the layer 12 of polyurethane and the layer 13 of polyester to each other. Instead, the toluene could be removed after the layer 12 of polyurethane and the layer 13 of polyester have been bonded to each other.

In this arrangement, it would only be necessary to have the temperature of the heated rollers 16 and 17 at a temperature above the softening point, approximately 250° F. to 275° F., of polyester but below the softening point of polyurethane. The bonded layers 12 and 13 would be heated above the softening point of polyurethane after bonding at the heated rollers 16 and 17 and prior to being cooled by the chill roll 22. Furthermore, the heat applied by the heaters 24 would be employed after the toluene has been removed and not after bonding of the layers 12 and 13.

An advantage of this invention is that it has an unlimited shelf life and does not curl or age while in storage. Another advantage of this invention is that the laminated material can be washed or dry cleaned. A further advantage of this invention is that it can be removed without damaging the material to which it is attached. Still another advantage of this invention is that it may be applied under a wide range of pressure conditions whereby any machine including a hand iron can be utilized. A still further advantage of this invention is that a wide range of temperatures may be employed to apply the laminated material to a sport uniform, for example, so that it can be applied to any type of material.

For purposes of exemplification, a particular embodiment of the invention has been shown and described according to the best present understanding thereof. However, it will be apparent that changes and modifications in the arrangement and construction of the parts thereof may be resorted to without departing from the scope of the invention.

What is claimed is:

1. A combination comprising a laminate of two layers, at least one layer of which contains a polyurethane and one layer includes a polyester, one of said layers being directly adhered to a fabric, said polyester being amorphous and said laminate prior to being adhered to said fabric being non-curling.

2. A combination according to claim 1 wherein the layer directly adhered to the fabric is thermoplastic.

3. A combination according to claim 1 wherein both the polyurethane and the polyester are thermoplastic.

4. A combination according to claim 3 wherein said layer not adhered to the fabric is thicker than said layer adhered to the fabric.

5. A combination according to claim 3 wherein one of said layers contains both the polyurethane and the polyester and the other layer contains polyurethane.

6. A combination according to claim 3 wherein the layer containing the polyester is in the form of an amorphous film.

7. A combination according to claim 3 wherein the layer containing the polyester is formed by extruding the polyester composition to form an amorphous film.

8. A combination according to claim 1 or 3 wherein both of said two layers have the same coefficient of expansion.

9. A combination according to claim 3 wherein the laminate is in the form of a letter or number.

10. A combination according to claim 3 wherein one of said layers has printing thereon.

11. A combination according to claim 9 or 10 wherein the fabric is a uniform.

12. A combination according to claim 3 wherein the layer adhered to the fabric has thickness no greater than 3 mils.

13. A combination according to claim 12 wherein the layer not adhered to the fabric has a thickness no greater than 5 mils.

14. A laminate of two films, at least one of the films containing a thermoplastic polyurethane and one film containing a thermoplastic polyester, said thermoplastic polyester being amorphous, and wherein said laminate is non-curling.

15. A laminate according to claim 14 in the form of a letter or number.

16. A laminate according to claim 14 wherein at least one of said films has printing thereon.

17. A laminate according to claim 14 wherein one of said films is thicker than the other of said films.

18. A laminate according to claim 14 wherein one of said films has a thickness no greater than 3 mils.

19. A laminate according to claim 14 wherein one of said films has a thickness no greater than 3 mils and the other of said films has a thickness no greater than 5 mils.

20. A laminate according to claim 14 wherein both of said two films have the same coefficient of expansion.

21. A process of forming the combination of claim 2 comprising directly adhering the laminate to the fabric with heat and pressure.

22. The process of claim 21 wherein said laminate is adhered to said fabric by application of heat and pressure for at most about 8 seconds.

23. The process of claim 2 wherein said laminate is adhered to said fabric by application of heat and pressure for at most about 1 second.

* * * * *